(12) United States Patent
Kikuchi et al.

(10) Patent No.: US 9,389,823 B2
(45) Date of Patent: Jul. 12, 2016

(54) IMAGE FORMING SYSTEM THAT EFFECTIVELY MANAGES JOBS

(71) Applicant: KYOCERA Document Solutions Inc., Osaka (JP)

(72) Inventors: Masaki Kikuchi, Osaka (JP); Jumpei Takagi, Osaka (JP); Keiji Okamura, Osaka (JP); Toru Yasui, Osaka (JP); Ryota Arinobu, Osaka (JP); Rie Matsumoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/222,672

(22) Filed: Mar. 23, 2014

(65) Prior Publication Data

US 2014/0293335 A1    Oct. 2, 2014

(30) Foreign Application Priority Data

Mar. 26, 2013 (JP) ................. 2013-065264

(51) Int. Cl.
*G06F 3/12* (2006.01)
*H04N 1/32* (2006.01)
*H04N 1/00* (2006.01)

(52) U.S. Cl.
CPC .............. *G06F 3/1286* (2013.01); *G06F 3/122* (2013.01); *G06F 3/1273* (2013.01); *G06F 3/1288* (2013.01); *H04N 1/00925* (2013.01); *H04N 1/32106* (2013.01); *H04N 1/0048* (2013.01); *H04N 1/00233* (2013.01); *H04N 2201/0094* (2013.01); *H04N 2201/3202* (2013.01); *H04N 2201/3274* (2013.01); *H04N 2201/3276* (2013.01)

(58) Field of Classification Search
USPC ........................................ 358/1.15
See application file for complete search history.

(56) References Cited

U.S. PATENT DOCUMENTS

| | | | | |
|---|---|---|---|---|
| 2006/0235896 A1* | 10/2006 | Matoba | ......................... | 707/200 |
| 2008/0016515 A1* | 1/2008 | Naim et al. | .................... | 719/313 |
| 2008/0074683 A1* | 3/2008 | Yanamura | ........... | H04N 1/00204 358/1.2 |
| 2009/0027726 A1* | 1/2009 | Kajikawa | ........... | H04N 1/00344 358/1.16 |
| 2012/0026533 A1* | 2/2012 | Yoshida | ....................... | 358/1.14 |

FOREIGN PATENT DOCUMENTS

| | | | |
|---|---|---|---|
| JP | 2007-166175 A | | 6/2007 |
| JP | 2007-174186 A | | 7/2007 |
| JP | 2007174186 A | * | 7/2007 |
| JP | 2008-233322 A | | 10/2008 |
| JP | 2011-088327 A | | 5/2011 |

* cited by examiner

Primary Examiner — Huo Long Chen
(74) Attorney, Agent, or Firm — James Judge

(57) ABSTRACT

An image forming system includes a login management unit, a job execution unit, a log management unit, and a mode accepting unit. The login management unit is configured to manage login of a user. The job execution unit is configured to execute a job after the user has logged in. The log management unit is configured to manage a job log of the job. The mode accepting unit is configured to accept a specification of a mode to store the job log. Acceptable modes where the mode accepting unit accepts a specification include a mode where the login management unit does not permit login if the log management unit determines that there is no free space to store the job log.

11 Claims, 12 Drawing Sheets

70

ERROR!

Login was not accepted due to no free space left to store job log.

CAUTION!

No free space is left to store job log.

FIG. 12

IMAGE FORMING SYSTEM THAT EFFECTIVELY MANAGES JOBS

CROSS-REFERENCE TO RELATED APPLICATION

This application is based upon, and claims the benefit of priority from, corresponding Japanese Patent Application No. 2013-065264 filed in the Japan Patent Office on Mar. 26, 2013, the entire contents of which are incorporated herein by reference.

BACKGROUND

Unless otherwise indicated herein, the description in this section is not prior art to the claims in this application and is not admitted to be prior art by inclusion in this section.

There is an image forming system, which manages job logs, accepts a specification of a mode for storing job logs. The modes that can be accepted by the image processing system include a transfer guarantee level "high" and a transfer guarantee level "low." The transfer guarantee level "high" is a mode in which execution of the job is cancelled when there is no free space for storing the job log. The transfer guarantee level "low" is a mode in which the oldest job log is deleted to store a new job log when there is no free space for storing the job log.

SUMMARY

An image forming system according to the disclosure includes a login management unit, a job execution unit, a log management unit, and a mode accepting unit. The login management unit is configured to manage login of a user. The job execution unit is configured to execute a job after the user has logged in. The log management unit is configured to manage a job log of the job. The mode accepting unit is configured to accept a specification of a mode to store the job log. Acceptable modes where the mode accepting unit accepts a specification include a mode where the login management unit does not permit login if the log management unit determines that there is no free space to store the job log.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

In the accompanying drawings:

FIG. 7 illustrates an example of log-full-state login error screen displayed in the operation illustrated in FIG. 5;

FIG. 8 illustrates the operation of the MFP according to the embodiment during execution of a job after the user has logged in;

FIG. 12 illustrates an example of log-full-state caution screen displayed in the operation illustrated in FIG. 8 and FIG. 9.

DETAILED DESCRIPTION

Figure 1:
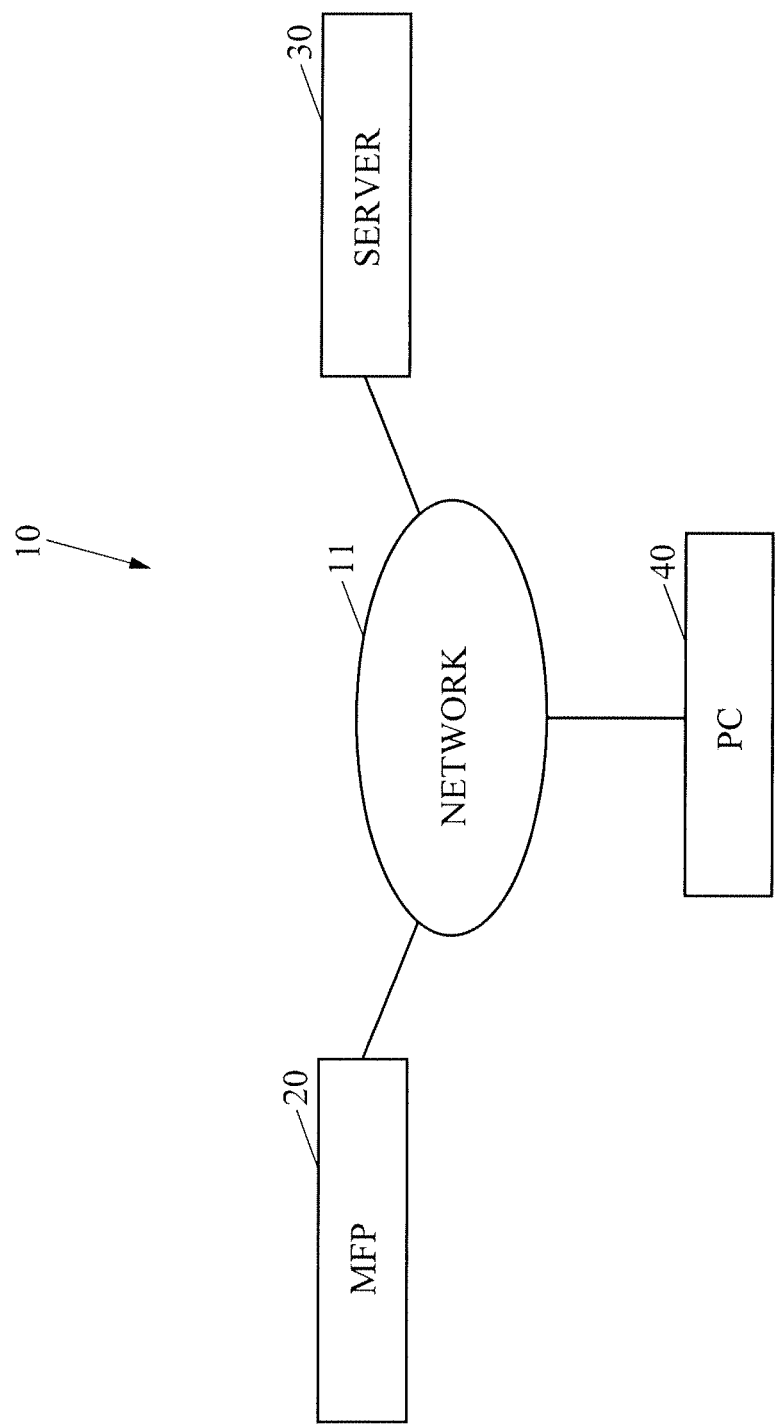
FIG. 1 illustrates a configuration of an image forming system according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

Firstly, a description will be given of a configuration of an image forming system 10 according to the embodiment.

FIG. 1 illustrates a configuration of the image forming system 10 according to the embodiment.

As illustrated in FIG. 1, the image forming system 10 includes a multifunction peripheral (MFP) 20 as an image forming apparatus, a server 30 as a computer for storing job logs of the MFP 20, and a personal computer (PC) 40 that can transmit print data to the MFP 20. The MFP 20 and the server 30 are connected in a communicable manner with each other via a network 11 such as a local area network (LAN) and the Internet. Similarly, the MFP 20 and the PC 40 are connected in a communicable manner with each other via the network 11.

Figure 2:
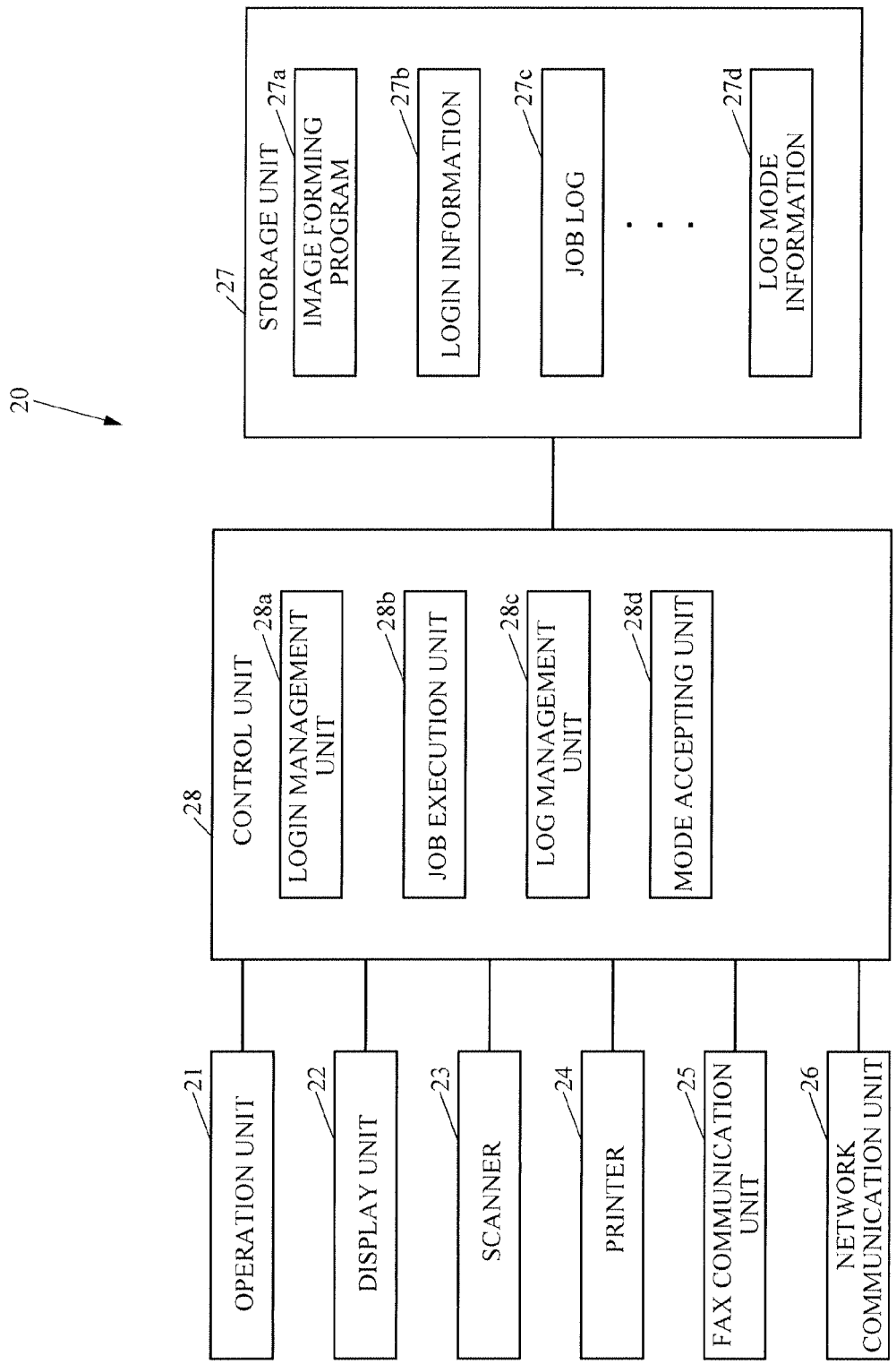
FIG. 2 illustrates a configuration of an MFP according to the embodiment.

FIG. 2 illustrates a configuration of the MFP 20.

As illustrated in FIG. 2, the MFP 20 includes an operation unit 21, a display unit 22, a scanner 23, a printer 24, a fax communication unit 25, a network communication unit 26, a storage unit 27, and a control unit 28. The operation unit 21 is an input device such as a button for inputting various operations by a user. The display unit 22 is a display device such as a liquid crystal display (LCD) that displays various types of information. The scanner 23 is a reading device that reads an image from a document. The printer 24 is a print device that executes a print job on a recording medium such as a paper sheet. The fax communication unit 25 that is a fax device that performs fax communication with an external facsimile device (not illustrated) via a communication line such as a dial-up line. The network communication unit 26 is a network communication device that communicates with an external device via the network 11 (see FIG. 1). The storage unit 27 is a storage device such as an electrically erasable programmable read only memory (EEPROM) and a hard disk drive (HDD) that stores various data. The control unit 28 controls the entire MFP 20.

The operation unit 21 may include an input device that forms a touch panel together with the display unit 22.

The storage unit 27 stores an image forming program 27a to be executed by the MFP 20. The image forming program 27a may be installed on the MFP 20 at production stage of the MFP 20, may be additionally installed on the MFP 20 from a storage medium such an SD card and a universal serial bus (USB) memory, or may be additionally installed on the MFP 20 from the network 11.

Additionally, the storage unit 27 can store login information 27b that includes a combination of an ID and a password of the user.

Additionally, the storage unit 27 can store a plurality of job logs 27c. The job log 27c includes a log image as a history of an image of a processing target in the job. The log image is, for example, image data in a portable document format (PDF) format.

The storage unit 27 can store log mode information 27d indicative of a mode (hereinafter referred to as a "log mode") stored in the job log 27c.

The control unit 28 includes, for example, a central processing unit (CPU), a read only memory (ROM) that stores a program and various data, and a random access memory (RAM) that is used for a work area of the CPU. The CPU executes a program stored in the ROM or the storage unit 27.

The control unit 28 executes the image forming program 27a stored in the storage unit 27 to function as a login management unit 28a, a job execution unit 28b, a log management unit 28c, and a mode accepting unit 28d. The login management unit 28a manages login of the user. The job execution unit 28b executes a job after the user has logged in. The log management unit 28c manages the job log 27c. The mode accepting unit 28d accepts a specification of the log mode.

The log management unit 28c limits the capacity for storing the job log 27c in the storage unit 27 by the maximum number (for example, 200) of the job logs 27c and the maximum size (for example, 10 GB) of the total of all the job logs 27c. The state where the number of the job logs 27c stored in the storage unit 27 has reached the maximum number, or the state where the total size of all the job logs 27c stored in the storage unit 27 has reached the maximum size is a state (hereinafter referred to as a "log-full state") where there is no free space left in the storage unit 27 to store the job log 27c. Here, the log management unit 28c causes, for example, the administrator of the MFP 20 to set the maximum number and the maximum size via the operation unit 21.

Next, a description will be given of the operation of the image forming system 10.

Firstly, a description will be given of the operation of the MFP 20 for accepting the specification of the log mode.

Figure 3:
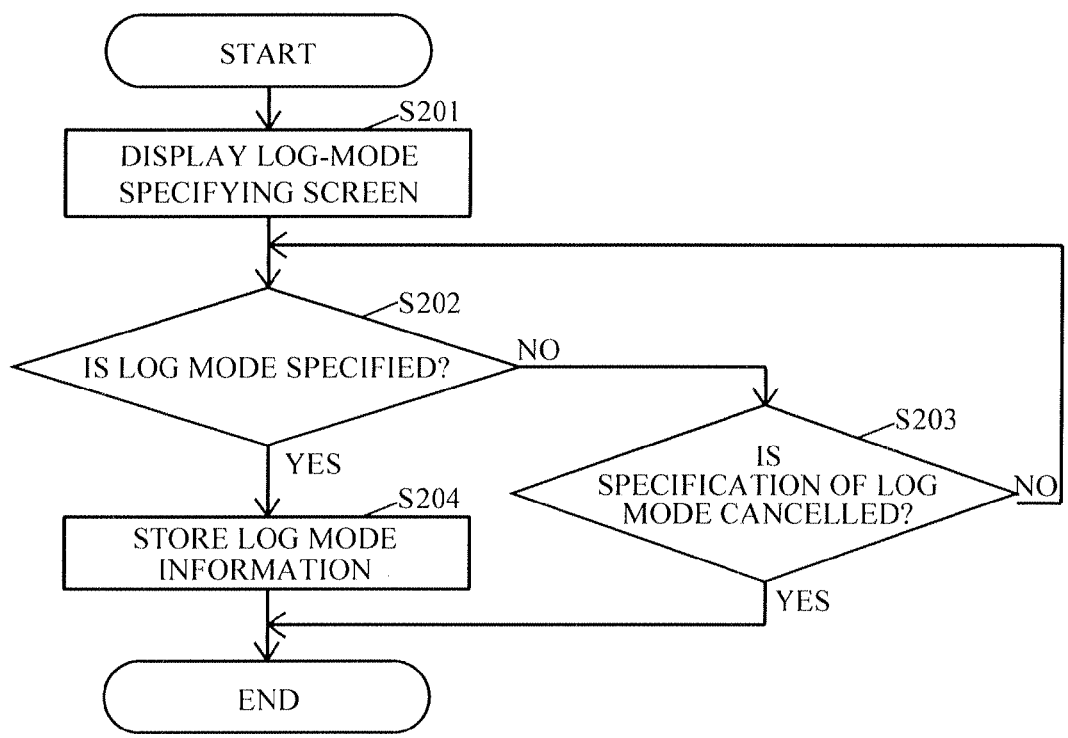
FIG. 3 illustrates an operation of the MFP according to the embodiment for accepting specification of a log mode.

FIG. 3 illustrates the operation of the MFP 20 for accepting the specification of the log mode.

When the administrator of the MFP 20 instructs the MFP 20 via the operation unit 21 to start the operation for accepting the specification of the log mode, the control unit 28 of the MFP 20 executes the operation illustrated in FIG. 3.

Figure 4:
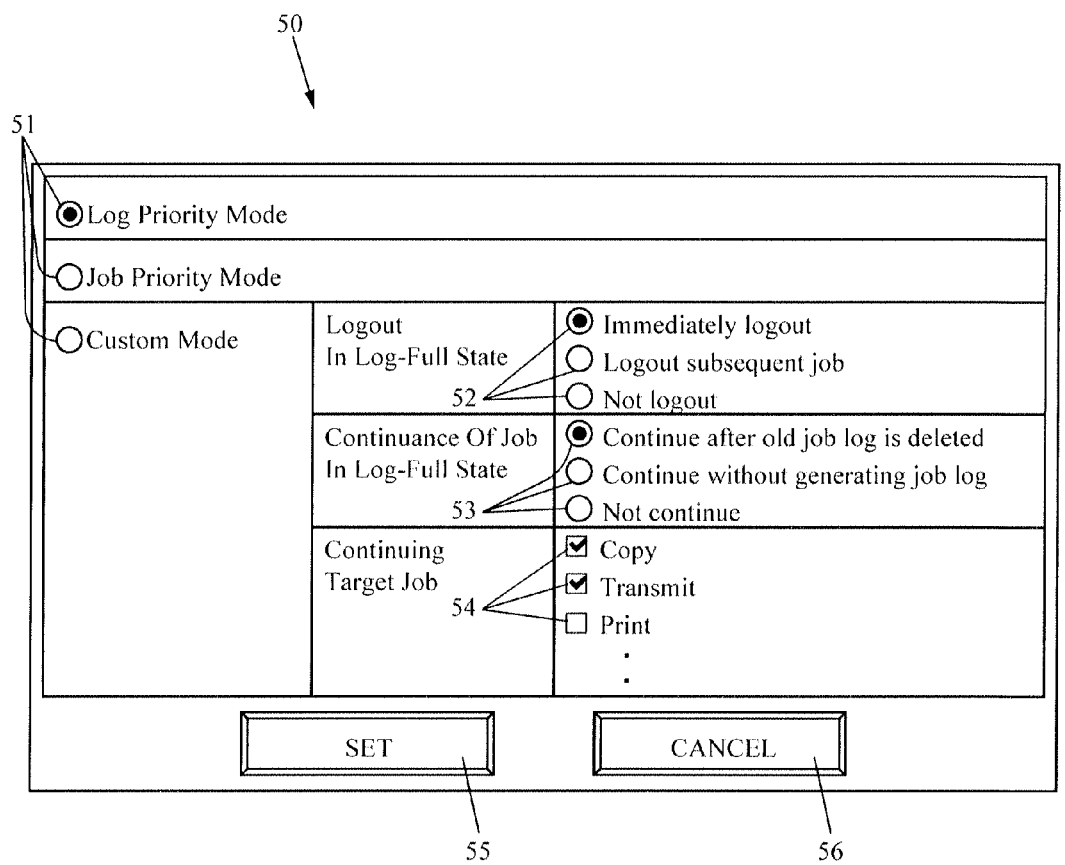
FIG. 4 illustrates an example of log-mode specifying screen displayed in the operation according to the embodiment.

As illustrated in FIG. 3, the mode accepting unit 28d of the control unit 28 displays a log-mode specifying screen 50 illustrated in FIG. 4 for accepting the specification of the log mode on the display unit 22 (in Step S201).

FIG. 4 illustrates an example of the log-mode specifying screen 50.

The log-mode specifying screen 50 illustrated in FIG. 4 includes a radio button 51 that causes the administrator to select a log mode via the operation unit 21. Log modes that can be selected with the radio button 51 include a "Log Priority Mode", a "Job Priority Mode", and a "Custom Mode". In the "Log Priority Mode", a job is not executed in the log-full state. In the "Job Priority Mode", a job is executed even in the log-full state. In the "Custom Mode", an operation set by the administrator is executed. Here, the "Log Priority Mode" has a higher security level compared with the "Job Priority Mode" because the job logs 27c is kept.

Additionally, the log-mode specifying screen 50 includes a radio button 52 that causes the administrator to select setting of the logout in the log-full state during the "Custom Mode" via the operation unit 21. Settings that can be selected with the radio button 52 include "Immediately logout", "Logout subsequent job", and "Not logout". With the "Immediately logout", a job being executed is cancelled and logout is executed when the state becomes the log-full state. With the "Logout subsequent job", logout is executed before the subsequent job is started after the job being executed is terminated when the state becomes the log-full state. With the "Not logout", logout is not executed even if the state becomes the log-full state. The radio button 52 may be, for example, grayed out such that the radio button 52 cannot be selected when the "Custom Mode" is not selected with the radio button 51.

Additionally, the log-mode specifying screen 50 includes a radio button 53 that causes the administrator to select setting of continuance of the job in the log-full state during the "Custom Mode" via the operation unit 21. Settings that can be selected with the radio button 53 include "Continue after old job log is deleted", "Continue without generating job log", and "Not continue". With the "Continue after old job log is deleted", the oldest job log 27c is deleted and execution of the job is continued when the state becomes the log-full state. With the "Continue without generating job log", execution of the job is continued without generating a new job log 27c when the state becomes the log-full state. With the "Not continue", execution of the job is not continued when the state becomes the log-full state. The radio button 53 may be, for example, grayed out such that the radio button 53 cannot be selected while the "Logout subsequent job" or the "Not logout" is not selected with the radio button 52.

The log-mode specifying screen 50 includes a plurality of check boxes 54 that causes the administrator to select a job to be continued in the log-full state during the "Custom Mode" (hereinafter referred to as a "continuing target job") via the operation unit 21. For example, jobs that can be selected with the check boxes 54 include "Copy", "Transmit", and "Print". In the "Copy", the printer 24 prints an image read from a document by the scanner 23 on a recording medium. In the "Transmit", the network communication unit 26 transmits the image read from the document by the scanner 23 to the external device of the MFP 20, for example, the PC 40 (see FIG. 1). In the "Print", the printer 24 prints the image based on the print data on a recording medium. The print data is received from the external device of the MFP 20, for example, the PC 40 via the network communication unit 26. The check boxes 54 may be, for example, grayed out such that the check boxes 54 cannot be selected while "Continue after old job log is deleted" or "Continue without generating job log" is not selected by the radio button 53.

Additionally, the log-mode specifying screen 50 includes a button 55 for accepting the specification of the log mode and a button 56 for canceling acceptance of the specification of the log mode.

As illustrated in FIG. 3, the mode accepting unit 28d determines whether or not the log mode is specified after the process in Step S201 (in Step S202). Here, the mode accepting unit 28d determines that the log mode is specified when the button 55 is pressed via the operation unit 21 on the log-mode specifying screen 50.

If the mode accepting unit 28d determines that the log mode is not specified in Step S202, the mode accepting unit 28d determines whether or not the specification of the log mode is cancelled (in Step S203). Here, the mode accepting unit 28d determines that the specification of the log mode is cancelled when the button 56 is pressed via the operation unit 21 on the log-mode specifying screen 50.

If the mode accepting unit 28d determines that specification of the log mode is cancelled in Step S203, the mode accepting unit 28d terminates the operation illustrated in FIG. 3.

On the other hand, if the mode accepting unit 28d determines that the specification of the log mode is not cancelled in Step S203, the process returns to Step S202 again.

If the mode accepting unit 28d determines that the log mode is specified in Step S202, the mode accepting unit 28d writes the settings selected with the radio button 51, the radio button 52, the radio button 53, and the check boxes 54 in the storage unit 27 as the log mode information 27d (in Step S204), and terminates the operation illustrated in FIG. 3.

Next, a description will be given of the operation of the MFP 20 for the login.

Figure 5:
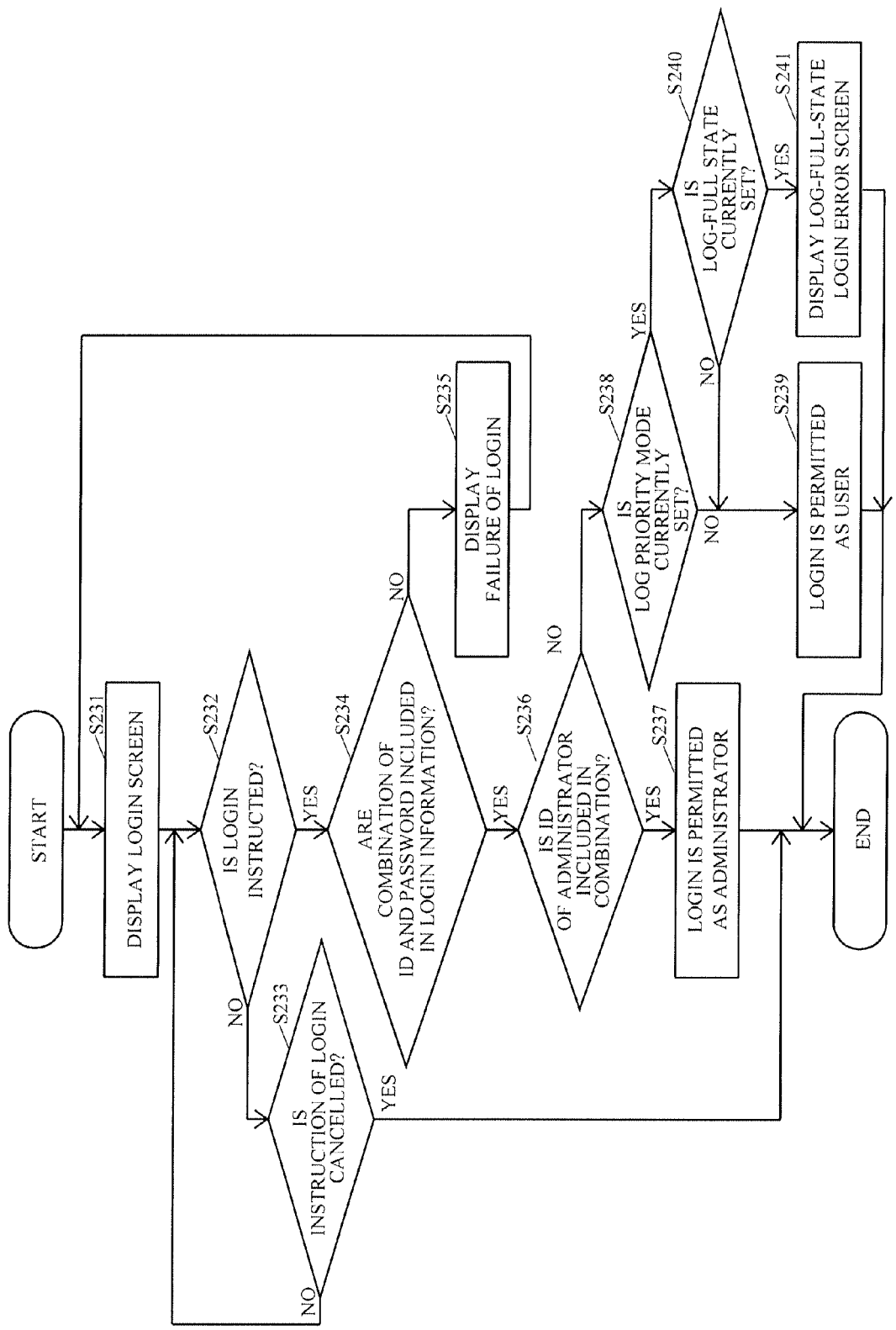
FIG. 5 illustrates the operation of the MFP according to the embodiment for login.

FIG. 5 illustrates the operation of the MFP 20 for the login.

When the user instructs the MFP 20 to start the operation for accepting the login via the operation unit 21, the control unit 28 of the MFP 20 executes the operation illustrated in FIG. 5.

Figure 6:
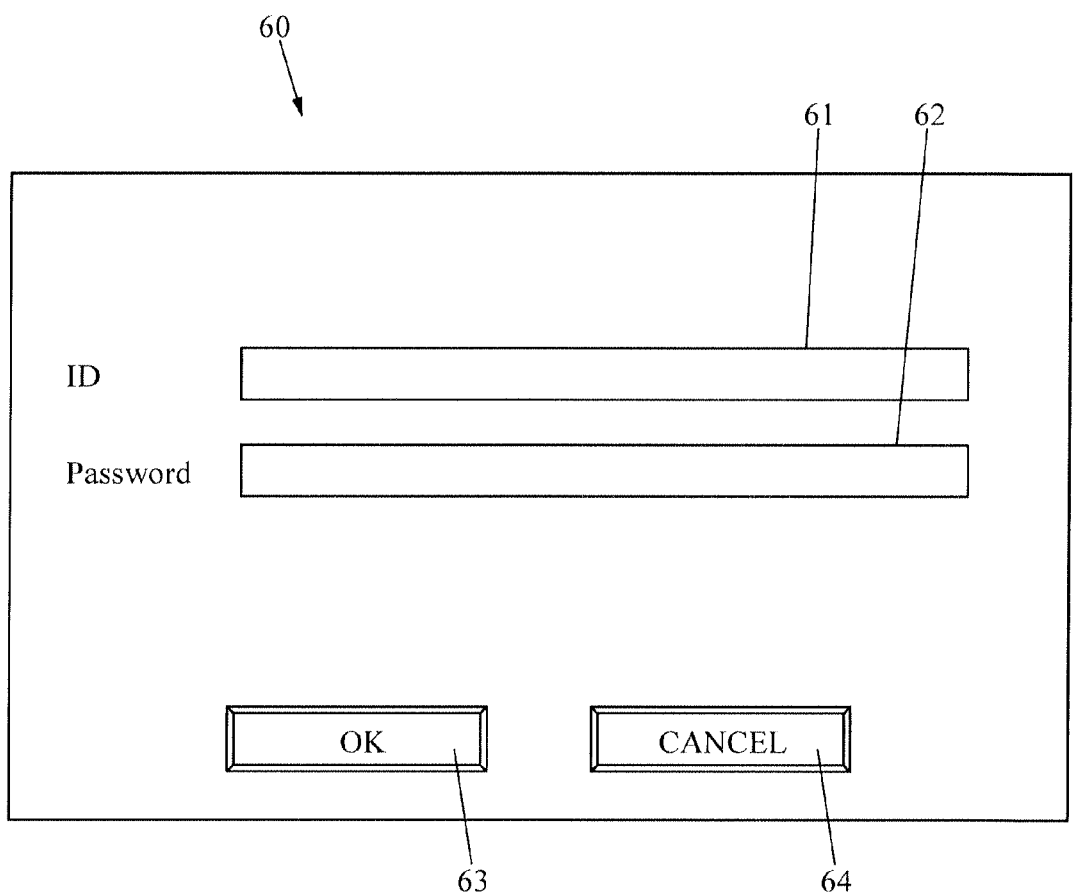
FIG. 6 illustrates an example of login screen displayed in the operation illustrated in FIG. 5.

As illustrated in FIG. 5, the login management unit 28a of the control unit 28 displays a login screen 60 illustrated in FIG. 6 for accepting the login on the display unit 22 (in Step S231).

FIG. 6 illustrates an example of the login screen 60.

The login screen 60 illustrated in FIG. 6 includes a text box 61, a text box 62, a button 63, and a button 64. The text box 61 causes the user to input the ID of the user via the operation unit 21. The text box 62 causes the user to input the password of the user via the operation unit 21. The button 63 is used to accept the instruction of the login. The button 64 is used to cancel the acceptance of the instruction of the login.

As illustrated in FIG. 5, the login management unit 28a determines whether or not the login is instructed after the process in Step S231 (in Step S232). Here, the login management unit 28a determines that the login is instructed when the button 63 is pressed in the login screen 60 via the operation unit 21.

If the login management unit 28a determines that the login is instructed in Step S232, the login management unit 28a determines whether or not the instruction of the login is cancelled (in Step S233). Here, the login management unit 28a determines that the instruction of the login is cancelled when the button 64 in the login screen 60 is pressed via the operation unit 21.

If the login management unit 28a determines that the instruction of the login is cancelled in Step S233, the login management unit 28a terminates the operation illustrated in FIG. 5.

On the other hand, if the login management unit 28a determines that the instruction of the login is not cancelled in Step S233, the process returns to Step S232 again.

If the login management unit 28a determines that the login is instructed in Step S232, the login management unit 28a determines whether or not the login information 27b on the storage unit 27 includes the combination of the ID and the password that are specified in the text box 61 and the text box 62 (in Step S234).

If the login management unit 28a determines that the login information 27b does not include the combination of the ID and the password that are specified in the text box 61 and the text box 62 in Step S234, the login management unit 28a displays failure of the login on the display unit 22 (in Step S235) and then the process returns to Step S231 again.

On the other hand, if the login management unit 28a determines that the login information 27b includes the combination of the ID and the password that are specified in the text box 61 and the text box 62 in Step S234, the login management unit 28a determines whether or not the ID of the administrator is included in the combination in the login information 27b (in Step S236).

If the login management unit 28a determines that this ID of the administrator is included in the combination in the login information 27b in Step S236, the login management unit 28a permits the login as an administrator (in Step S237) and then terminates the operation illustrated in FIG. 5.

On the other hand, if the login management unit 28a determines that the ID of the administrator is not included in the combination in the login information 27b in Step S236, the login management unit 28a determines whether or not the currently set log mode is the "Log Priority Mode" based on the log mode information 27d on the storage unit 27 (in Step S238).

If the login management unit 28a determines that the currently set log mode is not the "Log Priority Mode" in Step S238, the login management unit 28a permits the login as a user (in Step S239) and then terminates the operation illustrated in FIG. 5.

On the other hand, if the login management unit 28a determines that the currently set log mode is the "Log Priority Mode" in Step S238, the log management unit 28c of the control unit 28 determines whether or not the state is the log-full state (in Step S240).

If the log management unit 28c determines that the state is the log-full state in Step S240, the login management unit 28a displays a log-full-state login error screen 70 illustrated in FIG. 7 for notifying the user about the state where the login is not permitted in the log-full state on the display unit 22 (in Step S241) and then terminates the operation illustrated in FIG. 5.

On the other hand, if the log management unit 28c determines that the state is not the log-full state in Step S240, the login management unit 28a permits the login as a user (in Step S239) and terminates the operation illustrated in FIG. 5.

While the login to the MFP 20 via the operation unit 21 has been described above, login to the MFP 20 from the PC 40 via the network 11 is also possible. In case of the login to the MFP 20 from the PC 40 via the network 11, the displays in Steps S231, S235, and S241 are displayed on the display unit of the PC 40.

Next, a description will be given of the operation of the MFP 20 when a job is executed after the user has logged in.

Figure 8:
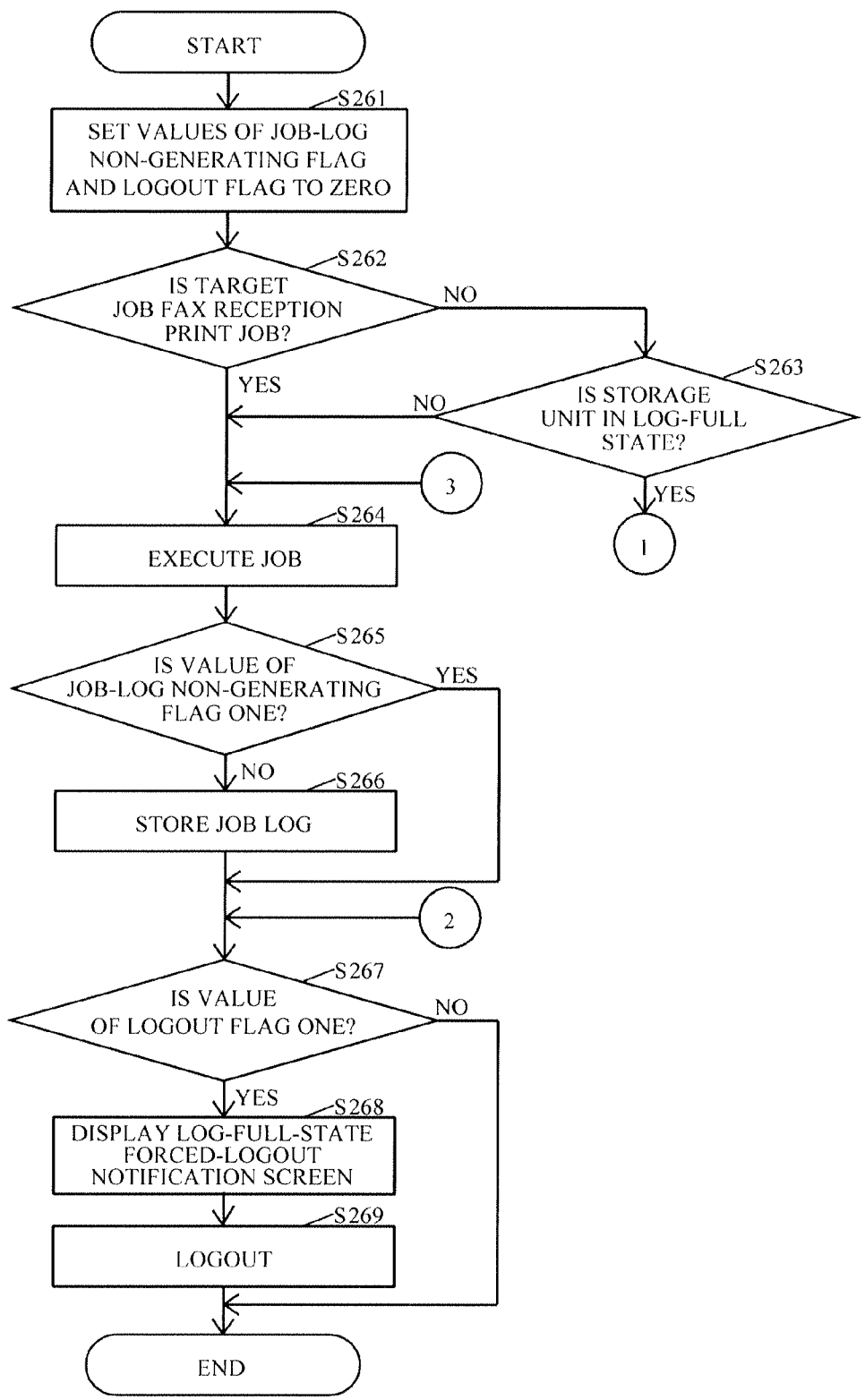
Figure 9:
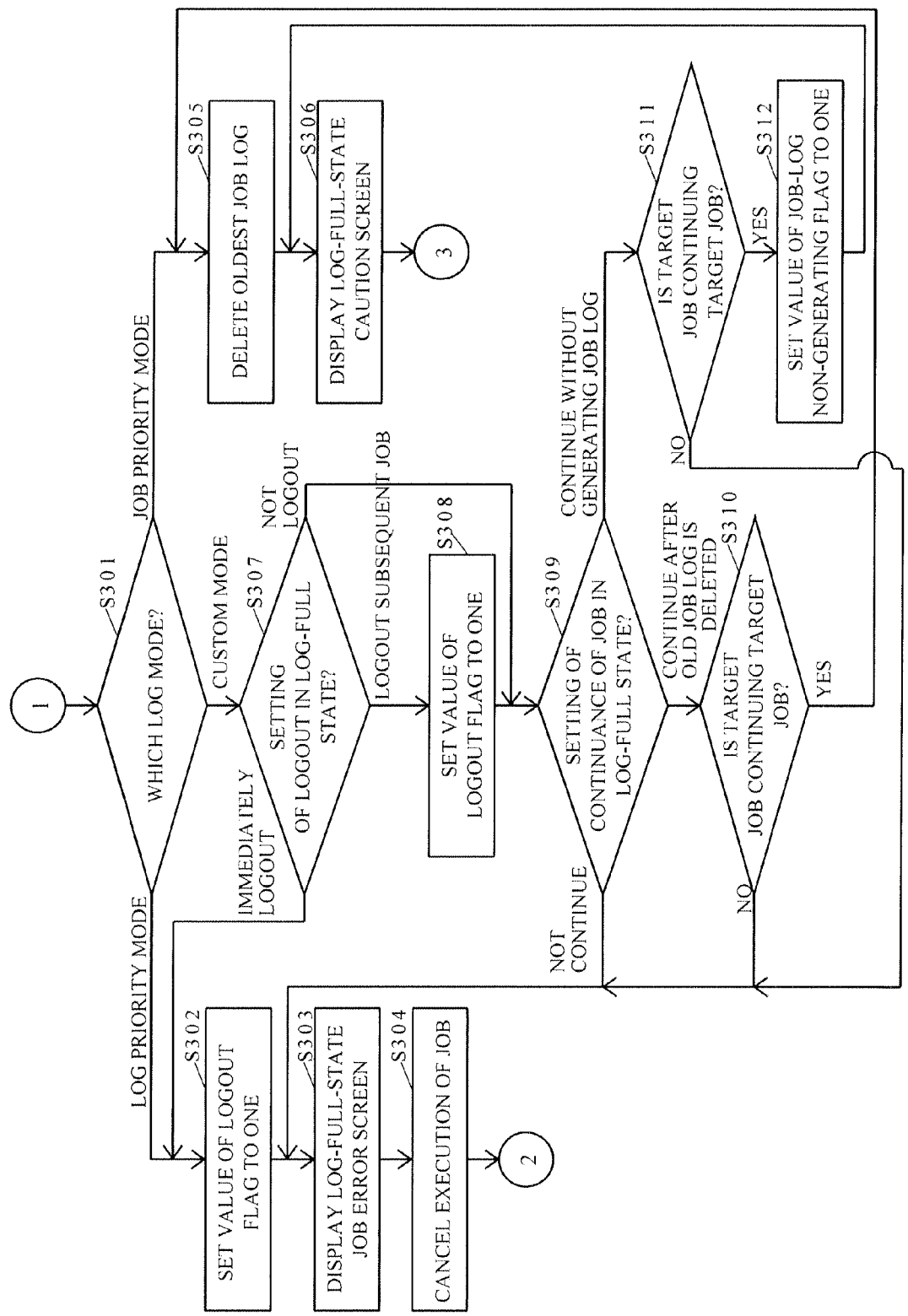
FIG. 9 illustrates the following operation of the operation in FIG. 8.

FIG. 8 illustrates the operation of the MFP 20 while a job is executed after the user has logged in. FIG. 9 illustrates the following operation of the operation in FIG. 8.

The control unit 28 of the MFP 20 executes the operation illustrated in FIG. 8 and FIG. 9 when the job is executed after the user has logged in.

As illustrated in FIG. 8, the job execution unit 28b of the control unit 28 sets a value of a job-log non-generating flag and a value of a logout flag to zero (in Step S261). The job-log non-generating flag indicates whether the job log 27c is not generated. The logout flag indicates whether or not to execute logout.

Subsequently, the job execution unit 28b determines whether or not the execution target job (hereinafter referred to as a "target job") is a "FAX reception print" job (in Step S262). In the "FAX reception print" job, the printer 24 prints the image based on the print data that is received via FAX by the fax communication unit 25 from the external facsimile device of the MFP 20 on a recording medium. The reason why only the "FAX reception print" job is exceptionally handled is that the "FAX reception print" job is a job that does not basically require login.

If the job execution unit 28b determines that the target job is not the "FAX reception print" job in Step S262, the log management unit 28c determines whether or not the storage unit is in the log-full state (in Step S263).

If the job execution unit 28b determines that the target job is the "FAX reception print" job in Step S262 or the log management unit 28c determines that the state is not the log-full state in Step S263, the job execution unit 28b executes the target job (in Step S264) and then determines whether or not the value of the job-log non-generating flag is one (in Step S265).

If the job execution unit 28b determines that the value of the job-log non-generating flag is not one in Step S265, the job execution unit 28b generates the job log 27c of the target job and stores this job log 27c in the storage unit 27 (in Step S266).

If the job execution unit 28b determines that the value of the job-log non-generating flag is one in Step S265 or terminates the process in Step S266, the job execution unit 28b determines whether or not the value of the logout flag is one (in Step S267).

Figure 10:
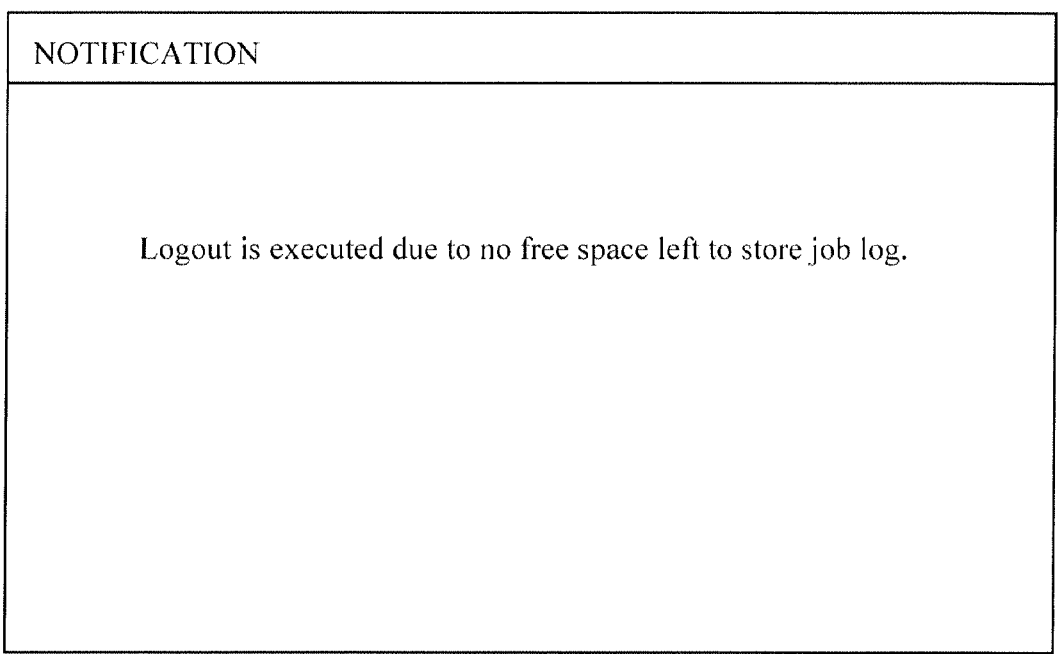
FIG. 10 illustrates an example of log-full-state forced-logout notification screen displayed in the operation illustrated in FIG. 8 and FIG. 9.

If the job execution unit 28b determines that the value of the logout flag is one in Step S267, the login management unit 28a displays a log-full-state forced-logout notification screen 80 illustrated in FIG. 10 on the display unit 22 (in Step S268) and then logs out the user (in Step S269). The log-full-state forced-logout notification screen 80 is used to notify the user about the forced logout in the log-full state.

If the job execution unit 28b determines that the value of the logout flag is not one in Step S267 or terminates the process in Step S269, the control unit 28 terminates the operation illustrated in FIG. 8 and FIG. 9.

If the log management unit 28c determines that the state is the log-full state in Step S263, the job execution unit 28b determines that the currently set log mode based on the log mode information 27d on the storage unit 27 (in Step S301).

If the job execution unit 28b determines that the currently set log mode is the "Log Priority Mode" in Step S301, the job execution unit 28b sets the value of the logout flag to one (in Step S302).

Figure 11:
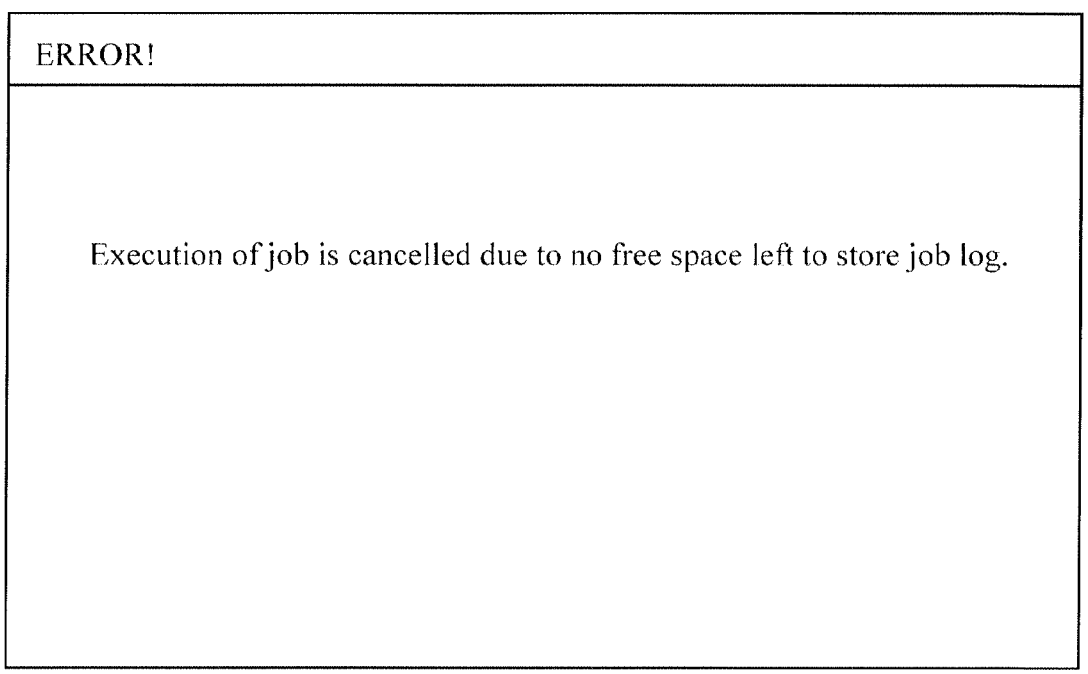
FIG. 11 illustrates an example of log-full-state job error screen displayed in the operation illustrated FIG. 8 and FIG. 9.

Subsequently, the job execution unit 28b displays a log-full-state job error screen 90 illustrated in FIG. 11 on the display unit 22 (in Step S303). The log-full-state job error screen 90 is used to notify the user about cancelling execution of a job in the log-full state. Subsequently, the job execution unit 28b cancels the execution of the target job (in Step S304), and then executes the process in Step S267.

If the job execution unit 28b determines that the currently set log mode is the "Job Priority Mode" in Step S301, the job execution unit 28b deletes the oldest job log 27c in the storage unit 27 (in Step S305). Subsequently, the job execution unit 28b displays a log-full-state caution screen 100 illustrated in FIG. 12 on the display unit 22 (in Step S306) and then executes the process in Step S264. The log-full-state caution screen 100 is used to notify the user about the log-full state.

If the job execution unit 28b determines that the currently set log mode is the "Custom Mode" in Step S301, the job execution unit 28b determines that the setting of the logout in the log-full state during the "Custom Mode" based on the log mode information 27d on the storage unit 27 (in Step S307).

If the job execution unit 28b determines that the setting of the logout in the log-full state during the "Custom Mode" is the "Immediately Logout" in Step S307, the job execution unit 28b executes the process in Step S302.

If the job execution unit 28b determines that the setting of the logout in the log-full state during the "Custom Mode" is the "Logout subsequent job" in Step S307, the job execution unit 28b sets the value of the logout flag to one (in Step S308).

If the job execution unit 28b determines that the setting of the logout in the log-full state during the "Custom Mode" is the "Not logout" in Step S307 or executes the process in Step S308, the job execution unit 28b determines that the setting of continuance of the job in the log-full state during the "Custom Mode" based on the log mode information 27d on the storage unit 27 (in Step S309).

If the job execution unit 28b determines that the setting of continuance of the job in the log-full state during the "Custom Mode" is the "Continue after old job log is deleted" in Step S309, the job execution unit 28b determines whether or not the target job is the continuing target job based on the log mode information 27d on the storage unit 27 (in Step S310).

If the job execution unit 28b determines that the target job is not the continuing target job in Step S310, the job execution unit 28b executes the process in Step S303.

On the other hand, if the job execution unit 28b determines that the target job is the continuing target job in Step S310, the job execution unit 28b executes the process in Step S305.

If the job execution unit 28b determines that the setting of continuance of the job in the log-full state during the "Custom Mode" is the "Continue without generating job log" in Step S309, the job execution unit 28b determines whether or not the target job is the continuing target job based on the log mode information 27d on the storage unit 27 (in Step S311).

If the job execution unit 28b determines that the target job is not the continuing target job in Step S311, the job execution unit 28b executes the process in Step S303.

On the other hand, if the job execution unit 28b determines that the target job is the continuing target job in Step S311, the job execution unit 28b sets the value of the job-log non-generating flag to one (in Step S312) and then executes the process in Step S306.

If the job execution unit 28b determines that the setting of continuance of the job in the log-full state during the "Custom Mode" is the "Not continue" in Step S309, the job execution unit 28b executes the process in Step S303.

While the case where the MFP 20 is instructed to execute the job via the operation unit 21 has been described above, the MFP 20 may be instructed to execute the job from the PC 40 via the network 11. In the case where the MFP 20 is instructed to execute the job from the PC 40 via the network 11, the displays in Steps S268, S303, and S306 are displayed on a display unit of the PC 40.

The MFP 20 may notify, for example, the administrator about the log-full state via e-mail or similar method in Step S306 instead of the display in Step S306 or in addition to the display in Step S306 for the notification to the administrator.

As described above, the job logs 27c stored in the storage unit 27 are transmitted to the server 30 by the log management unit 28c via the network communication unit 26 at a set time. Subsequently, the server 30 accumulates the job logs 27c transmitted from the MFP 20. The log management unit 28c of the MFP 20 deletes the job log 27c whose transmission to the server 30 is successful from the storage unit 27 while leaving, in the storage unit 27, the job log 27c whose transmission to the server 30 is failed due to communication errors or similar reason for preparation in the next transmission.

As described above, the image forming system 10 accepts the specification of the mode that does not permit login in the log-full state, that is, the "Log Priority Mode" (in Step S204). Subsequently, while the "Log Priority Mode" is specified (YES in Step S238), if there is no free space for storing the job log 27c (YES in Step S240), the image forming system 10 does not permit login (in Step S241). Accordingly, the image forming system 10 can reduce the execution of the unnecessary process in the log-full state.

While the "Log Priority Mode" is specified (YES in Step S238), if the job log 27c is deleted from the storage unit 27 and a free space for storing the job log 27c is generated again on the storage unit 27 (NO in Step S240), the image forming system 10 permits login (in Step S239). The log management unit 28c of the MFP 20 transmits the job logs 27c on the storage unit 27 to the server 30 as described above so as to delete the job logs 27c from the storage unit 27. Also, the log management unit 28c exports the job logs 27c on the storage unit 27 to an external storage device such as a USB flash drive so as to delete the job logs 27c from the storage unit 27.

Even if there is no free space for storing the job log 27c, only login of the administrator (YES in Step S236) is permitted by the image forming system 10 (in Step S237) to cause immediately transmitting the job logs 27c on the storage unit 27 to the server 30 corresponding to the instruction of the administrator or cause immediately exporting the job logs 27c on the storage unit 27 to the external storage device corresponding to the instruction of the administrator.

The image forming system 10 accepts a specification of the mode in which logout is executed in the log-full state (in Step S204). Here, modes in which logout is executed in the log-full state includes the "Log Priority Mode", the "Custom Mode" in which the "Immediately logout" is specified as the setting of the logout in the log-full state, and the "Custom Mode" in which the "Logout subsequent job" is specified as the setting of the logout in the log-full state. Accordingly, while the mode in which logout is executed in the log-full state is specified (the "Log Priority Mode" in Step S301 is specified, the "Custom Mode" in Step S301 and the "Immediately logout" in Step S307 are specified, or the "Custom Mode" in Step S301 and the "Logout subsequent job" in Step S307 are specified), if there is no free space for storing the job log 27c after login (YES in Step S263), the image forming system 10 executes logout (in Step S269) and does not execute the subsequent job. Accordingly, the image forming system 10 can reduce the execution of the unnecessary process in the log-full state.

The image forming system 10 accepts a specification of the mode in which the job being executed is cancelled in the log-full state and logout is executed (in Step S204). Here, the modes in which a job being executed in the log-full state is cancelled and logout is executed include the "Log Priority Mode" and the "Custom Mode" in which the "Immediately logout" is specified as the setting of the logout in the log-full state. Accordingly, while the mode in which a job being executed is cancelled in the log-full state and logout is executed is specified (the "Log Priority Mode" in Step S301 is specified or the "Custom Mode" in Step S301 and the "Immediately logout" in Step S307 are specified), if there is no free space for storing the job log 27c after login (YES in Step S263), the image forming system 10 cancels the job being executed (in Step S304) and then executes logout (in Step S269). Accordingly, the image forming system 10 can reduce the execution of the job whose job log 27c is not stored.

The image forming system 10 accepts a specification of the mode in which the job is executed without storing the job log 27c in the log-full state (in Step S204). Here, the modes in which a job is executed without storing the job log 27c in the log-full state include the "Custom Mode" in which the "Continue without generating job log" is specified as the setting of continuance of the job in the log-full state. Accordingly, while the mode in which a job is executed without storing the job log 27c in the log-full state is specified (the "Custom Mode" in Step S301, the "Logout subsequent job" or the "Not logout" in Step S307, the "Continue without generating job log" in Step S309, and YES in Step S311 are specified), even if there is no free space for storing the job log 27c (YES in Step S263), the image forming system 10 executes the job (in Step S264). Accordingly, the image forming system 10 can place priority on the execution of the job rather than storing the job log 27c.

The image forming system 10 accepts a specification of the mode in which only a specific type of job is executed in the log-full state (in Step S204). Here, the modes in which only a specific type of job is executed in the log-full state include the "Custom Mode" in which the continuing target job is specified. Accordingly, while the mode in which only a specific type of job is executed in the log-full state is specified (YES in Step S310 or YES in Step S311 is specified), even if there is no free space for storing the job log 27c (YES in Step S263), the image forming system 10 executes only the specific type of job (in Step S264). Accordingly, the image forming system 10 can place priority on the execution of the job rather than storing the job logs 27c regarding the specific type of job.

As described above, the image forming system 10 can adaptively switch the content of process corresponding to the security level set by log mode.

While in the embodiment the image forming system 10 has the configuration where the MFP 20 includes all of the login management unit, the job execution unit, the log management unit, and the mode accepting unit of the disclosure, the image forming system 10 may have a configuration where a part of these members is included in an apparatus such as the server 30 other than the MFP 20.

While in the embodiment the image forming system 10 includes the MFP as the image forming apparatus of the disclosure, the image forming system 10 may include an image forming apparatus such as a printer-only machine, a copy-only machine, and a FAX-only machine other than the MFP.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system, comprising:
   a login management unit configured to manage user login in accordance with job-log storage modes;
   a job execution unit configured to execute jobs conditional on user login and jobs not conditional on user login;
   a job-log storage for storing job logs of jobs executed by the job execution unit;
   a job-log management unit configured to determine job-log storing capacity of the job-log storage, and to store in the job-log storage, conditional on the determined job-log storing capacity, logs of jobs executed by the job execution unit and a mode accepting unit configured to accept designation of job-log storage modes in accordance with which the login management unit manages user login, the modes including a first job mode in which the login management unit does not permit login when the job-log management unit determines that the job-log storage does not have the capacity to store a further job log, and a second job mode in which the login management unit permits login, and the job-log management unit determines whether the job-log storage has the capacity to store a further job log; wherein the first job mode is a mode in which when the job-log management unit determines that the job-log storage has the capacity to store a further job log, the login management unit permits login and the job execution unit executes the job, and when the job-log management unit subsequently determines that the job-log storage does not have the capacity to store a further job log, the job execution unit cancels the job being executed, the second job mode includes a third mode in which the login management unit executes forced user logout when the job-log management unit determines that the job-log storage does not have the capacity to store a further job log and a sixth mode in which when the job-log management unit determines that the job-log storage does not have the capacity to store a further job log, the job execution unit deletes the oldest job log, then executes the job, and subsequent to the job execution unit storing a job log of the executed job, the login management unit maintains the login status, and the third mode includes a seventh mode in which when the job-log management unit determines that the job-log storage does not have the capacity to store a further job log, the job execution unit deletes the oldest job log, then executes the job, and subsequent to the job execution unit storing a job log of the executed job, the login management unit executes forced logout.

2. The image forming system according to claim 1, wherein the third mode includes a fourth mode in which a job being executed by the job execution unit is cancelled and subsequently the login management unit executes forced user logout, when the job-log management unit determines that the job-log storage does not have the capacity to store a further job log.

3. The image forming system according to claim 1, wherein the second mode includes a fifth mode in which the job execution unit executes only a specific type of job as en executable job when the job-log management unit determines that the job-log storage does not have the capacity to store a further job log, and the mode accepting unit accepts designation of the specific type of job.

4. An image forming method, comprising:

managing, via a login management unit, user login in accordance with job-log storage modes;

executing, via a job execution unit, jobs conditional on user login and jobs not conditional on user login;

storing, in a job-log storage, job logs of jobs executed via the job execution unit;

determining, via a job-log management unit, job-log storing capacity of the job-log storage, and storing in the job-log storage, via the job-log management unit, conditional on the determined job-log storing capacity, logs of jobs executed via the job execution unit; and accepting, via a mode accepting unit, designation of job-log storage modes in accordance with which the login management unit manages user login, the modes including a first job mode in which the managing, via the login management unit, of user login does not permit login when the determining, via the job-log management unit, of job-log storing capacity is that there is no free space in the job-log storage to store a further job log, and a second job mode in which the managing, via the login management unit, of user login permits login, with the determining, via the job-log management unit, of whether the job-log storage has the capacity to store a further job log; wherein the first job mode is a mode in which when the determining, via the job-log management unit, is that the job-log storage has the capacity to store a further job log, the managing, via the login management unit, permits login, and via the job execution unit the job is executed, and when the managing, via the job-log management unit, subsequently determines that the job-log storage does not have the capacity to store a further job log, via the job execution unit the job being executed is cancelled, and the second job mode includes a third mode in which the managing, via the login management unit, executes forced user logout when the determining, via the job-log management unit, of job-log storing capacity is that there is no free space in the job-log storage to store a further job log and a sixth mode in which when the job-log management unit determines that the job-log storage does not have the capacity to store a further job log, the job execution unit deletes the oldest job log, then executes the job, and subsequent to the job execution unit storing a job log of the executed job, the login management unit maintains the login status, and the third mode includes a seventh mode in which when the job-log management unit determines that the job-log storage does not have the capacity to store a further job log, the job execution unit deletes the oldest job log, then executes the job, and subsequent to the job execution unit storing a job to of the executed job, the login management unit executes forced logout.

5. The image forming method according to claim 4, wherein the third mode includes a fourth mode in with a job being executed by the executing, via the job execution unit, of a job is cancelled and subsequently the managing, via the login management unit, of user login executes forced user logout, when the determining, via the job-log management unit, of job-log storing capacity is that there is no free space in the job-log storage to store a further job log.

6. The image forming method according to claim 4, wherein the second mode includes a fifth mode in which the executing, via the job execution unit, of a job executes only a specific type of job as an executable job when the determining, via the job-log management unit, of job-log storing capacity is that there is no free space in the job-log storage to store a further job log and the accepting, via the mode accepting unit, accepts designation of the specific type of job.

7. A non-transitory computer-readable recording medium storing an image forming program executable by a computer of an image forming apparatus for causing the computer to function as:

a login management unit that manages user login in accordance with job-log storage modes;

a job execution unit that executes jobs conditional on user login and jobs not conditional on user login;

a job-log management unit that determines job-log storing capacity of a job-log storage, and stores in the job-log storage, conditional on the determined job-log storing capacity, logs of jobs executed by the job execution unit; and a mode accepting unit that accepts designation of job-log storage modes in accordance with which the login management unit manages user login, the modes including a first job mode in which the login management unit does not permit login when the job-log management unit determines that the job-log storage does not have the capacity to store a further job log, and a second job mode in which the login management unit permits login, and the job-log management unit determines whether the job-log storage has the capacity to store a further job log; wherein the first job mode is a mode in which when the job-log management unit determines that the job-log storage has the capacity to store a further job log, the login management unit permits login and the job execution unit executes the job, and when the job-log management unit subsequently determines that the job-log storage does not have the capacity to store a further job log, the job execution unit cancels the job being executed;

the second job mode includes a third mode in which the login management unit executes forced user logout when the job-log management unit determines that the job-log storage does not have the capacity to store a further job log and a sixth mode in which when job-log management unit determines that the job-log storage does not have the capacity to store a further job log, the job execution unit deletes the oldest job log, then executes the job, and subsequent to the job execution unit storing a job log of the executed job, the login management unit maintains the login status, and the third mode includes a seventh mode in which when the job-log management unit determines that the job-log storage does not have the capacity to store a further job log, the job execution unit deletes the oldest job log, then executes the job, and subsequent to the job execution unit storing a job log of the executed job, the login management unit executes forced logout.

8. The non-transitory computer-readable recording medium according to claim 7, wherein the third mode includes a fourth mode in which a job being executed by the job execution unit is cancelled and subsequently the login management unit executes forced user logout, when the job-log management unit determines that the job-log storage does not have the capacity to store a further job log.

9. The non-transitory computer-readable recording medium according to claim 7, wherein the second mode includes a fifth mode in which
the job execution unit executes only a specific type of job as an executable job when the job-log management unit determines that the job-log storage does not have the capacity to store a further job log, and
the mode accepting unit accepts designation of the specific type of job.

10. An image forming system comprising:
a login management unit configured to manage user login in accordance with job-log storage modes;
a job execution unit configured to execute jobs conditional on user login and jobs not conditional on user login;
a job-log storage for storing job logs of jobs executed by the job execution unit;
a job-log management unit configured to determine job-log storing capacity of the job-log storage, and to store in the job-log storage, conditional on the determined job-log storing capacity, logs of jobs executed by the job execution unit; and a mode accepting unit configured to accept designation of job-log storage modes in accordance with which the login management unit manages user login, the modes including a first job mode in which the login management unit does not permit login when the job-log management unit determines that the job-log storage does not have the capacity to store a further job log, and a second job mode in which the login management unit permits login, and the job-log management unit determines whether the job-log storage has the capacity to store a further job log; wherein the first job mode is a mode in which when the job-log management unit determines that the job-log storage has the capacity to store a further job log, the login management unit permits login and the job execution unit executes the job, and when the job-log management unit subsequently determines that the job-log storage does not have the capacity to store a further job log, the job execution unit cancels the job being executed;

the second job mode includes a third mode in which when the job-log management unit determines that the job-log storage does not have the capacity to store a further job log, the job execution unit executes the job, then the login management unit executes forced user logout, without the job-log management unit storing a job log of the job that the job execution unit executed, a second job mode includes a fifth mode in which the job execution unit executes only a specific type of job as an executable job the job-log management unit determines that the job-log storage does not have the capacity to store a further job log, and the mode accepting unit accepts designation of the specific type of job, the fifth mode being a mode in which
when the job-log management unit determines that the job-log storage does not have the capacity to store a further job log and when the job executed by the job execution unit is a specific type of job, the job execution unit cancels the oldest job log, then executes a job, and subsequent to the job execution unit stating a job log of the executed job, the login management unit executes forced logout, and
when the job-log management unit determines that the job-log storage does not have the capacity to store a further job log and the job executed by the job execution unit is not a specific type of job, the job being executed by the job execution unit is cancelled and the job login management unit executes forced logout;

the second job mode includes a sixth mode in which when the job-log management unit determines that the job-log storage does not have the capacity to store a further job log, the job execution unit deletes the oldest job log, then executes the job, and subsequent to the job execution unit storing a job log of the executed job, the login management unit maintains the login status; and the third mode includes a seventh mode in which when the job-log management unit determines that the job-log storage does not have the capacity to store a further job log, the job execution unit deletes the oldest job log, then executes the job, and subsequent to the job execution unit storing a job log of the executed job, the login management unit executes forced logout.

11. An image forming system comprising:
a login management unit configured to manage user login in accordance with job-log storage modes;

job execution unit configured to execute jobs conditional on user login and jobs not conditional on user login;

a job-log storage for storing job logs of jobs executed by the job execution unit;

a job-log management unit configured to determine job-log storing capacity of the job-log storage, and to store in the job-log storage, conditional on the determined job-log storing capacity, logs of jobs executed by the job execution unit; and a mode accepting unit configured to accept designation of job-log storage modes in accordance with which the login management unit manages user login, the modes including a first job mode in which the login management unit does not permit login when the job-log management unit determines that the job-log storage does not have the capacity to store a further job log, and a second job mode in which the login management unit permits login, and the job-log management unit determines whether the job-log storage has the capacity to store a further job log; wherein the first job mode is a mode in which when the job-log management unit determines that the job-log storage has the capacity to store a further job log, the login management unit permits login and the job execution unit executes the job, and when the job-log management unit subsequently determines that the job-log storage does not have the capacity to store a further job log, the job execution unit cancels the job being executed;

the second job mode includes a third mode in which when the job-log management unit determines that the job-log storage does not have the capacity to store a further job log, the job execution unit executes the job, then the login management unit executes forced user logout, without the job-log management unit storing a job log of the job that the job execution unit executed;

the second job mode includes a sixth mode in which when the job-log management unit determines that the job-log storage does not have the capacity to store a further job log, the job execution unit deletes the oldest job log, then executes the job, and subsequent to the job execution unit storing a job log of the executed job, the login management unit maintains the login status;

the third mode includes a seventh mode in which when the job-log management unit determines that the job-log storage does not have the capacity to store a further job log, the job execution unit executing deletes the oldest job log, then executes the job, and subsequent to the job execution unit storing a job log of the executed job, the login management unit executes forced logout; and the third mode includes a ninth mode in which when the job-log management unit determines that the job-log storage does not have the capacity to store a further job log, subsequent to the job execution unit executing the job, the login management unit executes logout without the job execution unit storing a job log of the executed job.

* * * * *